United States Patent [19]
Kern

[11] Patent Number: 4,995,123
[45] Date of Patent: Feb. 26, 1991

[54] OZONE DISPERSION SYSTEM

[76] Inventor: Donald W. Kern, 5290 Orcutt Rd., San Luis Obispo, Calif. 93401

[21] Appl. No.: 434,919

[22] Filed: Nov. 9, 1989

[51] Int. Cl.$^5$ .......................... E04H 3/20; C02F 1/78
[52] U.S. Cl. .......................................... 4/490; 4/542; 137/563; 210/101; 210/760
[58] Field of Search ................... 4/490, 492, 496, 507, 4/508, 509, 542; 210/87, 88, 89, 90, 101, 760, 765, 169; 137/119, 563, 883

[56] References Cited

U.S. PATENT DOCUMENTS

| | | | |
|---|---|---|---|
| 2,315,184 | 3/1943 | Boosey | 4/492 X |
| 3,426,899 | 2/1969 | Smith | 210/169 X |
| 3,449,772 | 6/1969 | Werner | 4/490 |
| 3,486,623 | 12/1969 | Bosico | 210/169 |
| 3,749,244 | 7/1973 | Jannuzzi, Jr. | 210/169 |
| 3,943,580 | 3/1976 | Carter | 4/492 |
| 4,185,333 | 1/1980 | Ortega | 4/508 X |
| 4,416,030 | 11/1983 | Reynoso | 4/492 X |
| 4,420,846 | 12/1983 | Bonner | 4/542 |
| 4,432,392 | 2/1984 | Paley | 137/883 |
| 4,542,854 | 9/1985 | Mathis | 4/492 X |
| 4,562,863 | 1/1986 | Claussen et al. | 137/559 |
| 4,592,379 | 6/1986 | Goettl | 137/119 X |
| 4,640,783 | 2/1987 | Kern | 4/490 X |
| 4,767,525 | 8/1988 | Campbell et al. | 210/760 X |

OTHER PUBLICATIONS

Sales Literature for "Delflo", Ozone Dispersion System, Taken from Aqua Magazine, Dec. 1989, p. 59.

Primary Examiner—Henry J. Recla
Assistant Examiner—Robert M. Fetsuga
Attorney, Agent, or Firm—Gordon L. Peterson; Loyal M. Hanson

[57] ABSTRACT

A system for dispersing ozone includes at least first and second ozone-injection ports at spaced-apart locations and different elevations in a swimming pool, components for communicating ozone from a separate source of ozone to each of the ozone-injection ports, and flow control components for controlling the rate at which the ozone flows to each of the ports by enabling a user to separately adjust the rate at which the ozone flows to each of the ports in order to compensate for differences in hydrostatic pressure. A flow controller apparatus includes a support structure that supports an inlet for coupling to a separate source or ozone, a plurality of outlets for coupling to a plurality of ozone-injection ports in a swimming pool, a manifold for communicating ozone from the inlet to each of the outlets, valves for enabling a user to separately adjust the rate at which the ozone flows from the manifold to each of the outlets, and indicator components, such as ball-and-tube flow indicators mounted vertically side-by-side to enable visual comparison, for providing a visually discernable indication of the rate at which the ozone is flowing from the manifold to each of the outlets.

12 Claims, 3 Drawing Sheets

OZONE DISPERSION SYSTEM

BACKGROUND OF THE INVENTION

1. Technical Field

This invention relates generally to swimming pools, and more particularly to a system and apparatus for dispersing ozone in swimming pool water for sanitizing purposes.

2. Background Information

Ozone can be a good substitute for the commercially available chlorine compounds often used for sanitizing swimming pool water. Its odor is less offensive, its effect on the human eye less irritating, and its pH neutral. Thus, problems associated with its use for sanitizing swimming pool water demand attention.

One problem concerns the need for adequate dispersal throughout the relatively large volume of essentially non-turbulent swimming pool water. Consider, for example, a swimming pool installation having an ozone generator that pumps ozone through a number of fixed ozone-injection ports installed during construction along the swimming pool bottom. That arrangement helps disperse the ozone throughout the pool water, but it may do so somewhat non-uniformly.

To see why, recall that the swimming pool bottom is usually inclined. As a result, ozone-injection ports distributed along the swimming pool bottom at various spaced-apart locations have different elevations, with the ozone naturally tending to flow more readily through the higher ports where it must overcome less hydrostatic pressure than through the lower ones. That means non-uniform dispersion and its adverse affect on sanitizing efficiency and effectiveness. Consequently, it is desirable to have some way to more uniformly disperse the ozone.

SUMMARY OF THE INVENTION

This invention solves the problems outlined above by providing a system, apparatus, and methodology that enable a user to separately adjust the rate at which ozone flows to each of a plurality of ozone-injection ports in a swimming pool, one embodiment including manually adjustable control valves coupled with visually perceivable flow indicators. Thus, more uniform dispersion can be achieved despite differences in ozone-injection port elevation and a user can tailor the system on site to a particular swimming pool installation.

Generally, a system constructed according to a major aspect of the invention includes a plurality of ozone-injection ports at spaced-apart locations in a swimming pool, means for communicating ozone from a separate source of ozone to each of the ozone-injection ports, and flow control means for controlling the rate at which the ozone flows from the separate source to each of the ozone-injection ports. The plurality of ozone-injection ports include at least a first ozone-injection port located at a first elevation and a second ozone-injection port located at a second elevation that is different from the first elevation, and the flow control means is configured to enable a user to separately adjust the rate at which the ozone flows from the separate source to each of the first and second ozone-injection ports in order to compensate for differences in hydrostatic pressure at the first and second ozone-injection ports.

In that regard, the means for communicating may include means defining a manifold for communicating ozone from the separate source of ozone to each of the plurality of ozone-injection ports, and the means for controlling may include valve means operatively connected to the manifold for enabling a user to adjust the rate at which the ozone flows from the manifold to each of the ozone-injection ports. In addition, the means for controlling may further include indicator means operatively connected to the manifold for providing a visually discernable indication of the rate at which the ozone is flowing from the manifold to each of the ozone-injection ports, and the indicator means may take the form of a plurality of ball-and-tube flow indicators. Furthermore, the ball-and-tube flow indicators may be mounted vertically in side-by-side relation in order to facilitate visual comparison.

According to another aspect of the invention, there is provided an apparatus for controlling the rate at which ozone flows to each of a plurality of ozone-injection ports in a swimming pool. The apparatus includes a support structure that supports an inlet for coupling to a separate source or ozone, a plurality of outlets for coupling to a plurality of ozone-injection ports in a swimming pool, and a manifold for communicating ozone from the inlet to each of the plurality of outlets. In addition, the support structure supports valves for enabling a user to separately adjust the rate at which the ozone flows from the manifold to each of the outlets and flow indicators for providing a visually discernable indication of the rate at which the ozone is flowing from the manifold to each of the outlets.

As in the case of the system, the flow indicators may take the form of a plurality of ball-and-tube flow indicators. Each one of the ball-and-tube flow indicators is operatively connected between the manifold and a respective one of the plurality of outlets to indicate the rate at which ozone flows from the manifold to the respective one of the plurality of outlets. Preferably, the ball-and-tube flow indicators are mounted vertically on the support structure in side-by-side relation in order to facilitate visual comparison of them.

In line with the above, a method of dispersing ozone in swimming pool water for sanitizing purposes includes the steps of communicating ozone from a separate source of ozone to a manifold having a plurality of at least first and second outlets, communicating the ozone from each of the first and second outlets to a respective one of first and second ozone-injection ports at spaced-apart locations and different elevations in a swimming pool, and separately adjusting the rate at which ozone flows from the manifold to each of the first and second ozone-injection ports in order to compensate for differences in hydrostatic pressure at the first and second ozone-injection ports.

Preferably, the step of communicating the ozone from each of the first and second outlets includes communicating the ozone through a respective one of first and second indicator means in order to provide a visually discernable indication of the rate at which the ozone is flowing from the manifold to the respective one of the first and second ozone-injection ports. In addition, each one of the first and second indicator means preferably includes a respective one of first and second ball-and-tube flow indicators and the step of separately adjusting the rate at which ozone flows from the manifold to each of the first and second ozone-injection ports includes visually comparing the ball-and-tube flow indicators.

DESCRIPTION OF THE PREFERRED EMBODIMENTS

Figure 1:
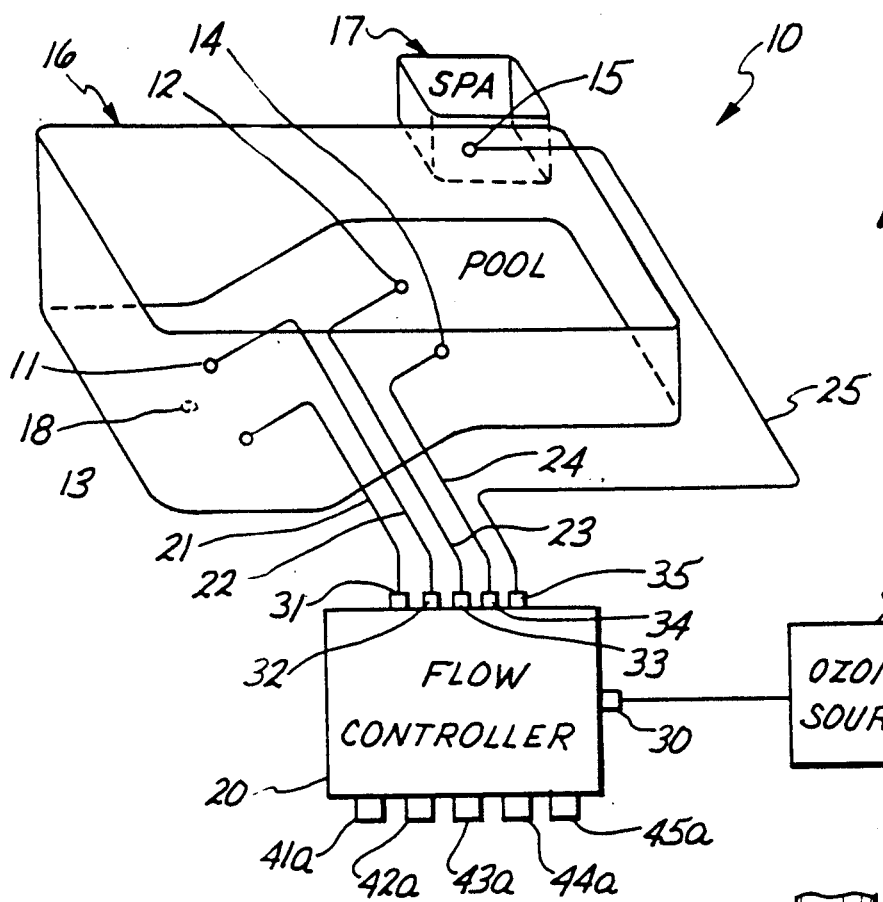
FIGURE 1 of the drawings is a diagrammatic representation of a ozone dispersion system installed in a conventional swimming pool.

Referring now to FIG. 1, there is shown an ozone dispersion system 10 constructed according to the invention. Generally, the system 10 includes a plurality of dispersion heads or ozone-injection ports 11-15 at spaced-apart locations in a swimming pool 16 and an adjacent spa 17. The ports 11-15 including at least a first ozone-injection port (such as the port 11) located at a first elevation (e.g., at the level of the main drain 18) and a second ozone-injection port (such as the port 12) located at a second elevation that is different from the first elevation (e.g., at the shallower end of the pool 16). Of course, there may be more than just two ports within the broader inventive concepts disclosed and they may be located at more than just two different elevations. In addition, there need be no spa.

However, the illustrated embodiment includes five ports of which one is located in the spa 17, each one of the ports 11-15 including suitable known componentry forming a discharge port through which to discharge ozone into the swimming pool water such as a dispersion head body set in the bottom of the pool 16 or spa 17 during construction over which a perforated plate something like a drain cover is mounted. Ozone under pressure from a suitable known source of ozone or ozone generator 19 (such as that commercially available from DEL Industries Inc. of San Luis Obispo, Calif. under the trademark DEL POOLZONE, Model ZO-830) flows through a flow controller apparatus or controller 20 subsequently described and thereafter through conduits 21-25 (such as one-half inch PVC pipe) to each of the dispersion heads of the ports 11-15, the controller 20 and the conduits 21-25 serving as means for communicating ozone from a separate source of ozone to each of the ozone-injection ports 11-15. From there the ozone flows upwardly out of the ports 11-15 and through the swimming pool water in the pool 16, sanitizing the water along the way.

The flow controller 20 serves as flow control means for controlling the rate at which the ozone flows from the ozone generator 19 to each of at least first and second ones and preferably all of the ports 11-15, and it is configured to enable a user to separately adjust the rate at which the ozone flows from the ozone generator 19 to each of those ports in order to compensate for differences in hydrostatic pressure at the ports. Thus, the user can adjust the flow of ozone to develop a desired dispersion pattern in the swimming pool water in the pool 16.

He can do so, for example, to substantially equalize the rate at which ozone flows through each of the ports 11-15, or he may do so to set different rates according to the elevation of the ports in order to compensate for the correspondingly different amount of swimming pool water above each port that the ozone is to sanitize.

Figure 4:
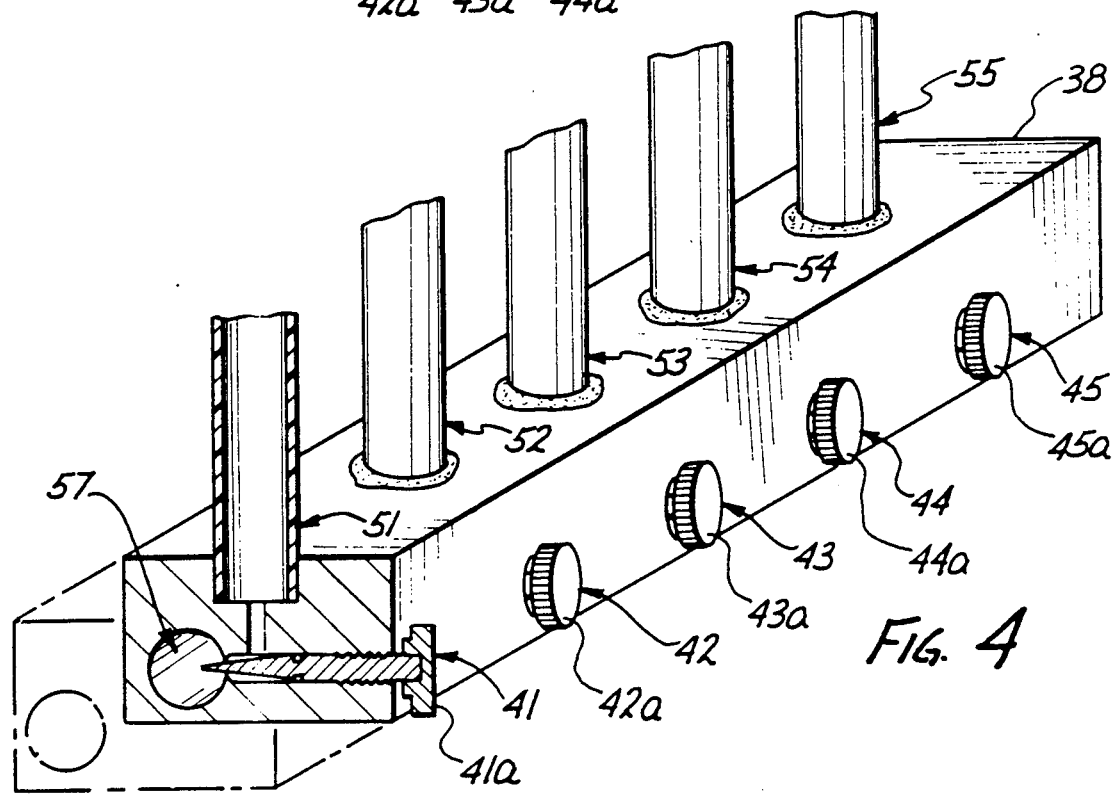
FIG. 4 is an enlarged perspective view of the manifold in the flow controller, with a portion in cross section to show the interconnection between needle valves and ball-and-tube indicators.
Figure 2:
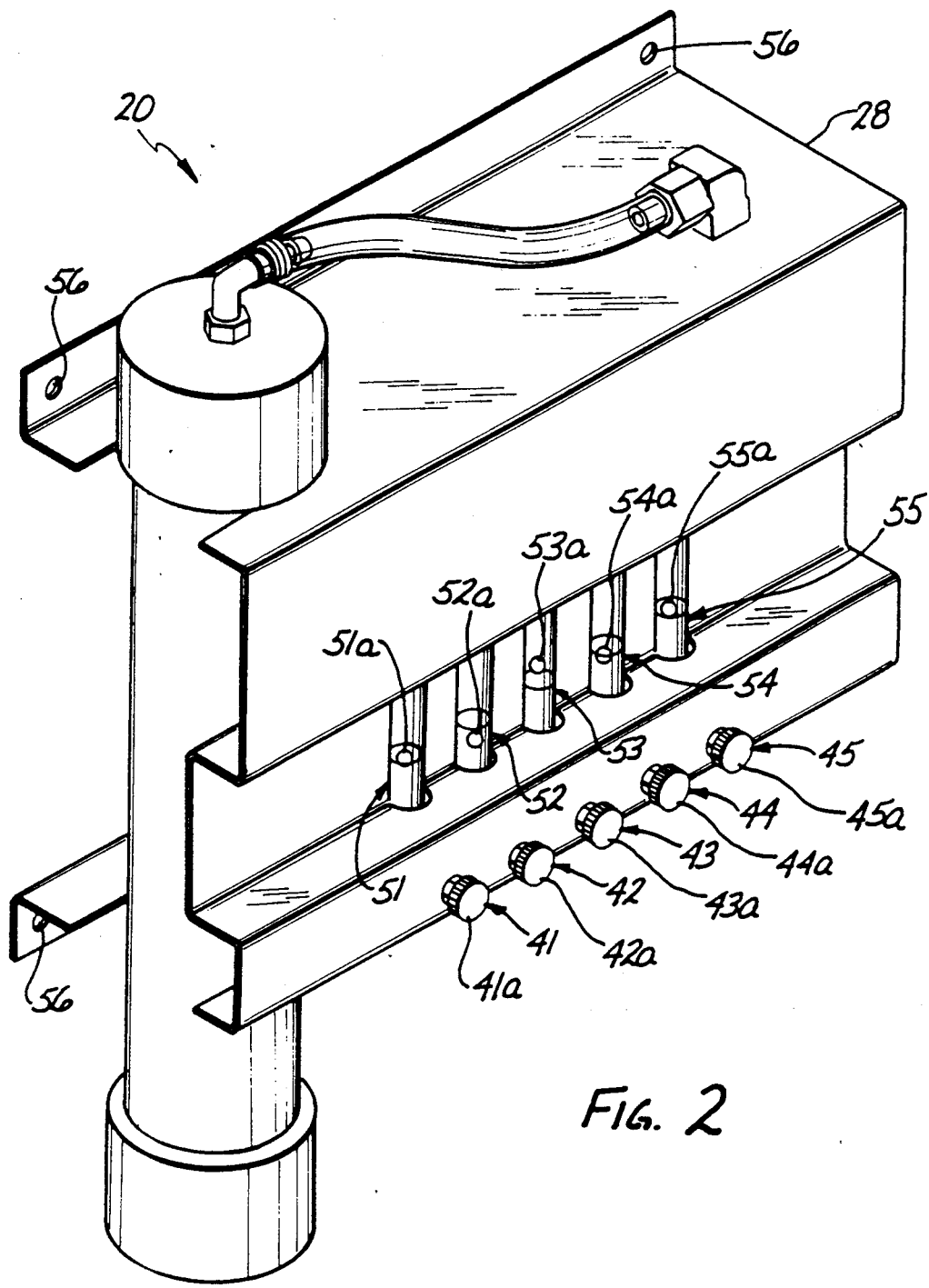
FIG. 2 is a perspective view of a flow controller constructed according to the invention.
Figure 3:
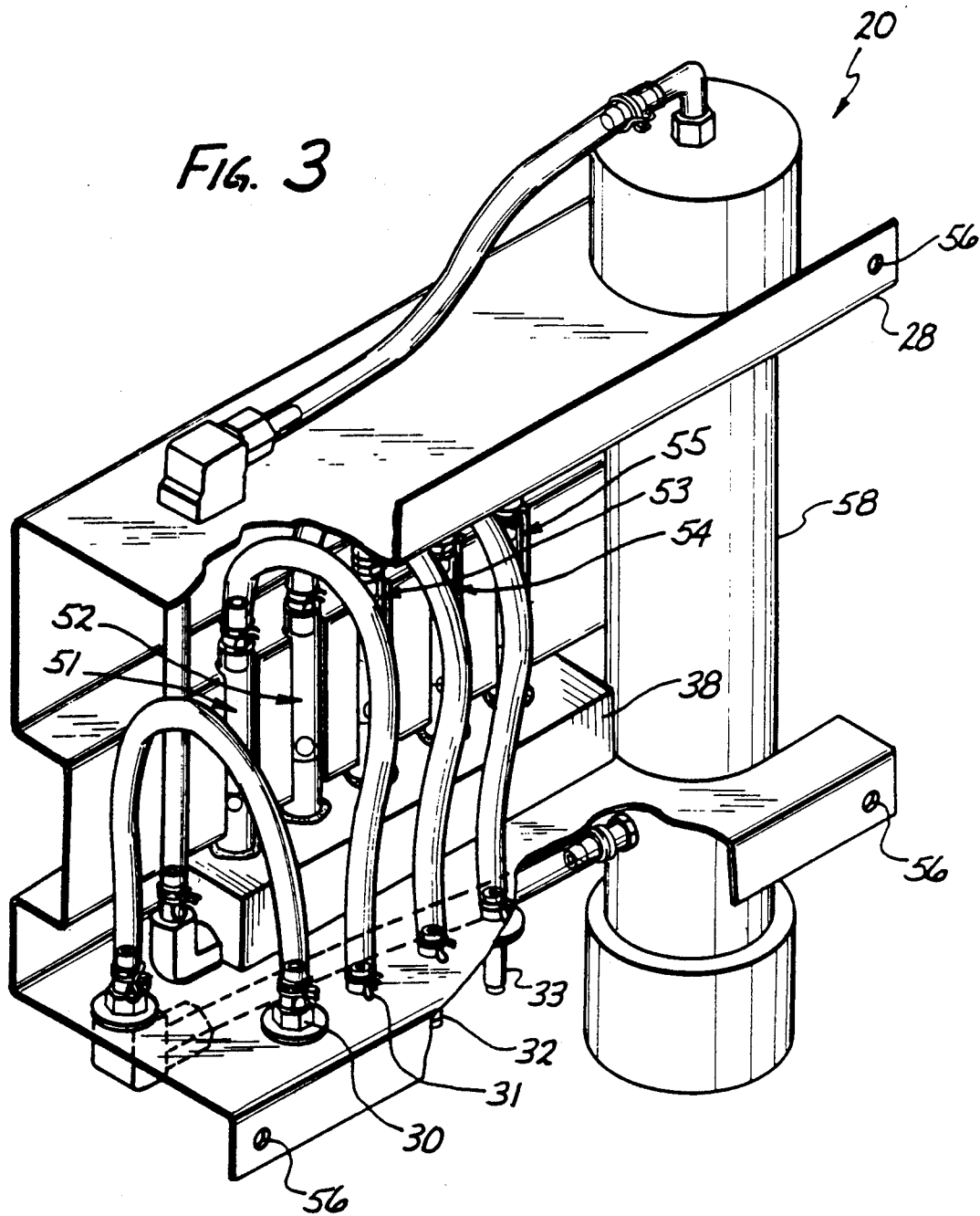
FIG. 3 is another perspective view of the flow controller showing the backside.

Further details of the controller 20 are shown in FIGS. 2-4. Generally, the controller 20 includes a support structure 28 (FIGS. 2 and 3) that supports means defining an inlet 30 (FIGS. 1 and 3) for coupling to a separate source or ozone such as the ozone generator 19 and means defining a plurality of outlets 31-35 (FIGS. 1 and 3) for coupling to a plurality of ozone-injection ports in a swimming pool, such as the ports 11-15 in the pool 16 and spa 17. In addition, the support structure 28 supports means defining a manifold 38 (FIGS. 2 and 4) for communicating ozone from the inlet 30 to each of the outlets 31-35, valves 41-45 (FIGS. 2 and 4) that serve as means for enabling a user to separately adjust the rate at which the ozone flows from the manifold 38 to each of the outlets 31-35, and flow indicators 51-55 (FIGS. 2-4) that serve as means for providing a visually discernable indication of the rate at which the ozone is flowing from the manifold 38 to each of the outlets 31-35.

As an idea of size, the support structure 28 is about eight inches high, ten inches wide, and three inches deep. Of course, those dimensions are not critical. In addition, the support structure 28 is fabricated from a suitable rigid material having sufficient strength to support the components described, such as a section of one-sixteenth inch thick steel alloy that has been bent into the illustrated configuration and provided with mounting holes 56 (FIGS. 2 and 3).

The inlet 30 and the outlets 31-35 may be constructed of suitable known components, such as male hose connectors, and they may be coupled as illustrated by transparent plastic tubing to the flow indicators 51-55. In that regard, the outlets 34 and 35 are omitted from FIG. 3 to help show other aspects of the controller 20. The controller 20 may utilize any of various known flow indicator devices such as the known ball-and-tube type of flow indicators 51-55 illustrated, and the flow indicators 51-55 are suitably mounted on the manifold 38 by known means so that they are disposed vertically in side-by-side relationship as illustrated. Ozone flowing into the inlet 30 passes through a passage 57 in the manifold 38 (which may take the form of a block of aluminum alloy material). The passage 57 is in fluid communication with each of the needle valves 41-45 so that the ozone flows from the passage 57 through the needle valves 41-45 and the flow indicators 51-55 to the outlets 31-35. Of course, other known types of valves may be used within the broader inventive concepts disclosed.

Each one of the flow indicators 51-55 is in fluid communication with a respective one of needle valves 41-45 so that by manipulating the knobs 41a-45a (FIGS. 1, 2 and 4) a user can adjust the needle valves 41-45 and thereby the rate at which ozone flows to the outlets 31-35 while observing the flow indicators 51-55. The greater the rate, the higher the balls 51a-55a move. By adjusting the flow of ozone so that the balls 51a-55a are at the same height, the user can substantially equalize the rate at which ozone is flowing to each of the outlets 31-35. In that regard, a portion of the manifold 38 (which may be a block of aluminum alloy material) is broken away in FIG. 4 to illustrate the relationship of the flow indicator 51 and needle valve 41 to a passage 57 in the manifold 38. The other flow indicators and needle valves are similarly related.

In other words, the flow indicator means includes a plurality of ball-and-tube flow indicators, each one of which ball-and-tube flow indicators is operatively connected between the manifold and a respective one of the plurality of outlets to indicate the rate at which ozone flows from the manifold to the respective one of the plurality of outlets. In addition, the ball-and-tube flow indicators are mounted vertically on the support structure in side-by-side relation in order to facilitate visual comparison of the visually discernable indications provided by the ball-and-tube flow indicators. Preferably, they are so mounted so that the balls are at the same height when the rate of flow is equal.

The controller 20 also includes means defining a filter/dryer cartridge 58 on the support structure for filtering particulate matter and removing moisture from the ozone received from the separate source of ozone. A known type of filter/dryer cartridge may be used for that purpose, interconnected between the inlet 30 and the manifold 38 as illustrated in FIG. 3 by suitable means such as plastic hose.

In line with the above, a method of dispersing ozone in swimming pool water for sanitizing purposes includes the step of communicating ozone from a separate source of ozone to a manifold having a plurality of at least first and second outlets. The method proceeds by communicating the ozone from each of the first and second outlets to a respective one of first and second ozone-injection ports at spaced-apart locations and different elevations in a swimming pool and separately adjusting the rate at which ozone flows from the manifold to each of the first and second ozone-injection ports in order to compensate for differences in hydrostatic pressure at the first and second ozone-injection ports.

The step of communicating the ozone from each of the first and second outlets may include communicating the ozone through a respective one of first and second indicator means in order to provide a visually discernable indication of the rate at which the ozone is flowing from the manifold to the respective one of the first and second ozone-injection ports. In addition, each one of the first and second indicator means may include a respective one of first and second ball-and-tube flow indicators and the step of separately adjusting the rate at which ozone flows from the manifold to each of the first and second ozone-injection ports may include visually comparing the ball-and-tube flow indicators.

Thus, this invention provides a system, apparatus, and methodology that enable a user to separately adjust the rate at which ozone flows to each of a plurality of ozone-injection ports in a swimming pool, preferably including manually adjustable control valves coupled with visually perceivable flow indicators. As a result, more uniform dispersion can be achieved despite differences in ozone-injection port elevation and a user can tailor the system on site to a particular swimming pool installation.

Although an exemplary embodiment of the invention has been shown and described, many changes, modifications, and substitutions may be made by one having ordinary skill in the art without necessarily departing from the spirit and scope of the invention.

What is claimed is:

1. A system for dispersing ozone in swimming pool water, comprising:
   a plurality of ozone-injection ports adapted to be disposed at spaced-apart locations in a swimming pool;
   means for communicating ozone from a separate source of ozone to each of the ozone-injection ports; and
   flow control means for controlling the rate at which the ozone flows from the source to each of the ozone-injection ports;
   the plurality of ozone-injection ports including at least a first ozone-injection port located at a first elevation and a second ozone-injection port located at a second elevation that is different from the first elevation;
   the flow control means enabling a user to separately adjust the rate at which the ozone flows from the source to each of the first and second ozone-injection ports in order to compensate for differences in hydrostatic pressure at the first and second ozone-injection ports; and
   the means for communicating ozone including a manifold and the flow control means includes a plurality of manually adjustable valves carried by the manifold for separately controlling the rate at which the ozone flows from the source of ozone to each of the ozone-injection ports, respectively.

2. A system as recited in claim 1, wherein the means for controlling further includes indicator means operatively connected to the manifold for providing a visually discernable indication of the rate at which the ozone is flowing from the manifold to each of the ozone-injection ports.

3. A system as recited in claim 2, wherein the indicator means includes a plurality of ball-and-tube flow indicators.

4. A system as recited in claim 3, wherein the ball-and-tube flow indicators are mounted vertically in side-by-side relation in order to facilitate visual comparison of the visually discernable indications provided by the ball-and-tube flow indicators.

5. A system for sanitizing swimming pool water with ozone, comprising:
   a swimming pool;
   a source of ozone;
   a plurality of ozone-injection ports at spaced-apart locations in the swimming pool;
   means for communicating ozone from the source of ozone to each of the ozone-injection ports; and
   flow control means for controlling the rate at which the ozone flows from the source of ozone to each of the ozone-injection ports;
   the plurality of ozone-injection ports including at least a first ozone-injection port located at a first elevation and a second ozone-injection port located at a second elevation that is different from the first elevation;
   the flow control means enabling a user to separately adjust the rate at which the ozone flows from the source to each of the first and second ozone-injection ports in order to compensate for differences in hydrostatic pressure at the first and second ozone-injection ports; and
   the means for communicating ozone including a manifold and the flow control means includes a plurality of manually adjustable valves carried by the manifold for separately controlling the rate at which the ozone flows from the source of ozone to each of the ozone-injection ports, respectively.

6. A system as recited in claim 5, wherein the means for controlling further includes indicator means operatively connected to the manifold for providing a visually discernable indication of the rate at which the ozone is flowing from the manifold to each of the ozone-injection ports.

7. A system as recited in claim 6, wherein the indicator means includes a plurality of ball-and-tube flow indicators.

8. A system as recited in claim 7, wherein the ball-and-tube flow indicators are mounted vertically in side-by-side relation in order to facilitate visual comparison of the visually discernable indications provided by the ball-and-tube flow indicators.

9. A method of dispersing ozone in swimming pool water for sanitizing purposes, comprising:
communicating ozone from a separate source of ozone to a manifold having a plurality of at least first and second outlets;
communicating the ozone from each of the first and second outlets to a respective one of first and second ozone-injection ports at spaced-apart locations and at different elevations in a swimming pool; and
separately adjusting the rate at which ozone flows from the manifold to each of the first and second ozone-injection ports in order to compensate for differences in hydrostatic pressure at the first and second ozone-injection ports.

10. A method as recited in claim 9, wherein the step of communicating the ozone from each of the first and second outlets includes communicating the ozone through a respective one of first and second indicator means in order to provide a visually discernable indication of the rate at which the ozone is flowing from the manifold to the respective one of the first and second ozone-injection ports.

11. A method as recited in claim 10, wherein each one of the first and second indicator means includes a respective one of first and second ball-and-tube flow indicators and the step of separately adjusting the rate at which ozone flows from the manifold to each of the first and second ozone-injection ports includes visually comparing the ball-and-tube flow indicators.

12. A method of dispersing ozone in swimming pool water for sanitizing purposes wherein the pool has a plurality of ports at different elevations in the pool, said method comprising:
separately adjusting the flow rate of ozone to each of the ports to compensate for differences in hydrostatic pressure at the ports and to obtain the desired dispersion of ozone in the water in the pool.

* * * * *

UNITED STATES PATENT AND TRADEMARK OFFICE
CERTIFICATE OF CORRECTION

PATENT NO. : 4,995,123
DATED : February 26, 1991
INVENTOR(S) : Donald W. Kern

It is certified that error appears in the above-identified patent and that said Letters Patent is hereby corrected as shown below:

Column 6, line 4 delete "separate".

Column 8, line 22 as a new paragraph with indentation insert

-- supplying ozone to each of said ports; and --.

Signed and Sealed this

Sixth Day of October, 1992

Attest:

DOUGLAS B. COMER

*Attesting Officer*   Acting Commissioner of Patents and Trademarks